US008461723B2

(12) United States Patent
Kojima

(10) Patent No.: US 8,461,723 B2
(45) Date of Patent: Jun. 11, 2013

(54) NON-CONTACT ELECTRIC POWER TRANSMISSION CIRCUIT

(75) Inventor: Hideki Kojima, Kawagoe (JP)

(73) Assignee: Toko, Inc., Ota-Ku, Tokyo-To (JP)

( * ) Notice: Subject to any disclaimer, the term of this patent is extended or adjusted under 35 U.S.C. 154(b) by 251 days.

(21) Appl. No.: 12/653,266

(22) Filed: Dec. 9, 2009

(65) Prior Publication Data

US 2010/0148590 A1    Jun. 17, 2010

(30) Foreign Application Priority Data

Dec. 12, 2008  (JP) ................................. 2008-316572

(51) Int. Cl.
*H01F 38/00* (2006.01)
(52) U.S. Cl.
USPC ................ 307/104; 320/108; 363/17; 363/98
(58) Field of Classification Search
USPC ...................... 307/104, 140; 320/108; 363/17
See application file for complete search history.

(56) References Cited

U.S. PATENT DOCUMENTS

| | | | | |
|---|---|---|---|---|
| 4,796,145 | A * | 1/1989 | Oshikiri .......................... | 361/57 |
| 6,750,560 | B1 * | 6/2004 | Nishimoto et al. ................ | 307/1 |
| 6,958,919 | B1 * | 10/2005 | Kung .............................. | 363/17 |
| 7,242,594 | B2 * | 7/2007 | Chan et al. ....................... | 363/17 |
| 7,294,972 | B2 * | 11/2007 | Chou et al. ..................... | 315/219 |

(Continued)

FOREIGN PATENT DOCUMENTS

| JP | 2002-233158 | 8/2002 |
|---|---|---|
| JP | 2005-348567 | 12/2005 |
| JP | 2006-197711 | 7/2006 |

OTHER PUBLICATIONS

LinFinity Microelectronics, RangeMax LX1686 Digital Dimming CCFL Controller IC Preliminary Data Sheet, Copyright 2000, LinFinity Microelectronics Inc, http://www.datasheetarchive.com/LX1686-datasheet.html, pp. 1-5.*

*Primary Examiner* — Jared Fureman
*Assistant Examiner* — Alfonso Perez Borroto
(74) *Attorney, Agent, or Firm* — Renner, Kenner, Greive, Bobak, Taylor & Weber

(57) ABSTRACT

A non-contact electric power transmission circuit according to an embodiment of the invention includes an electric power transmission circuit and an electric power receiving circuit. The electric power transmission circuit includes a full bridge circuit and a resonant type full bridge circuit. A direct-current power supply is used as an input of the full bridge circuit, the full bridge circuit includes two sets of switching elements, two switching elements being connected in series in each set of the switching elements, a drive circuit alternately feeds a pulse signal to gates of the switching elements to perform switching of the direct-current input in the full bridge circuit, and a serial resonant circuit of a resonant capacitor and an electric power transmission coil is connected to an output of the full bridge circuit in the resonant type full bridge circuit. The electric power receiving circuit includes an electric power receiving coil and a rectifying and smoothing circuit. The electric power receiving coil is electromagnetically coupled to the electric power transmission coil, and the rectifying and smoothing circuit rectifies an output of the electric power receiving coil. In the non-contact electric power transmission circuit, a push-pull output PWM control circuit is provided in the drive circuit that controls the full bridge circuit, and only one of the switching elements in each set of switching elements performs a regenerative operation. Therefore, a non-contact electric power transmission circuit in which the resonant type full bridge circuit can be controlled by PWM control at a level similar to that of a phase shift operation can be provided.

3 Claims, 4 Drawing Sheets

U.S. PATENT DOCUMENTS

| | | | |
|---|---|---|---|
| 7,405,955 B2 * | 7/2008 | Nakahori | 363/52 |
| 7,515,446 B2 * | 4/2009 | Lin | 363/98 |
| 2004/0022075 A1 * | 2/2004 | Perry | 363/21.01 |
| 2006/0239043 A1 * | 10/2006 | Ohbo | 363/25 |
| 2008/0157909 A1 * | 7/2008 | Chen et al. | 336/105 |
| 2008/0197711 A1 * | 8/2008 | Kato et al. | 307/104 |
| 2008/0197883 A1 * | 8/2008 | Onishi | 326/82 |
| 2008/0231120 A1 * | 9/2008 | Jin | 307/104 |
| 2009/0190650 A1 * | 7/2009 | Huang et al. | 375/238 |

* cited by examiner

NON-CONTACT ELECTRIC POWER TRANSMISSION CIRCUIT

BACKGROUND OF THE INVENTION

1. Field of the Invention

The present invention relates to a non-contact electric power transmission circuit, particularly to a method for controlling an electric power transmission circuit.

2. Description of the Related Art

As to a conventional non-contact electric power transmission circuit, a resonant type full bridge circuit system is generally used as a high-efficiency non-contact electric power transmission circuit in a low DC input.

However, in a drive circuit of a general PWM control system, a duty ratio is set equal to or lower than 50% to provide a dead time in order to prevent switching elements from being simultaneously turned on to pass a short-circuit current. A period during which all the switching elements are turned off is generated due to the dead time. At this point, a voltage waveform at both ends of the switching element vibrates largely during the turn-off period. This is because an excitation current vibrates by floating capacitance or leakage inductance when the switching element is switched from the turn-on to the turn-off. Because the vibration of the voltage increases an unnecessary radiation noise, disadvantageously it is necessary to use a switching element having a high withstand voltage.

A phase shift control method is well known as the method for solving the problem. In the phase shift control method, when the switching element is turned off, a regenerative operation is performed to control the excitation current. That is, the rapid change in excitation current can be eliminated. For example, Japanese patent Application Laid-Open Nos. 2002-233158, 2005-348567, and 2006-197711 disclose the phase shift control method.

A general phase shift switching operation will be briefly described with reference to a block diagram of FIG. 1. When a first switching element Q1 and a fourth switching element Q4 of a full bridge circuit 2 are turned on, a positive current is passed through an electric power transmission coil L1. Then the first switching element Q1 is turned off, and energy regeneration is performed by the fourth switching element Q4 and body diode of a second switching element Q2. Then the fourth switching element Q4 and the second switching element Q2 are turned on to continue the energy regeneration, and a direction of the current is reversed to continue the energy regeneration. The fourth switching element Q4 is turned off, and the body diode of the fourth switching element Q4 and the second switching element Q2 are turned on to continue the energy regeneration. Then the second switching element Q2 and a third switching element Q3 are turned on to pass a negative current through the electric power transmission coil L1. The second switching element Q2 is turned off, and the body diode of the first switching element Q1 and the third switching element Q3 perform the energy regeneration. Then the first switching element Q1 and the third switching element Q3 are turned on to continue the energy regeneration, and the energy regeneration is continued even if the direction of the current is reversed. Then the third switching element Q3 is turned off, and the first switching element Q1 and the body diode of the third switching element Q3 perform the energy regeneration. Then the first switching element Q1 and the fourth switching element Q4 are immediately turned on to complete one-period operation. In the general phase shift switching operation, the regenerative operation is performed by a combination of the first and third switching elements Q1 and Q3 and a combination of the second and fourth switching elements Q2 and Q4.

However, in the phase shift control method, a pulse of a duty ratio that is determined in principle is shifted to perform the control. A closed-loop feedback pulse signal is always necessary to restrict an operating range from a light load to an overload. On the other hand, in a method for controlling the non-contact electric power transmission circuit, a load change is determined by detecting a current passed through an electric power transmission coil via an electric power receiving coil or a voltage generated across the power transmission coil via the electric power receiving coil. Therefore, the general phase shift control method is not suitable for the non-contact electric power transmission circuit in which the closed-loop feedback signal is hardly obtained. Because timing of the phase shift operation is difficult, a commercially available phase shift control IC is generally used. In a general specification of the phase shift control IC, an output is shut down at a maximum duty ratio from the viewpoint of an IC characteristic. When the output exceeds the maximum duty ratio, the first and second switching elements Q1 and Q2 or the third and fourth switching elements. Q3 and Q4 are simultaneously turned on to pass the short-circuit current. Therefore, generally the feedback signal is always applied, and the output is stopped when the maximum duty ratio continues.

SUMMARY OF THE INVENTION

In order to solve the above-described problem, an object of the present invention is to provide a non-contact electric power transmission circuit in which the resonant type full bridge circuit can be controlled by PWM control at a level similar to that of the phase shift operation.

In order to achieve the object, a non-contact electric power transmission circuit according to an aspect of the invention includes an electric power transmission circuit that includes a full bridge circuit and a resonant type full bridge circuit, a direct-current power supply being used as an input of the full bridge circuit, the full bridge circuit including two sets of switching elements, two switching elements being connected in series in each set of the switching elements, a drive circuit alternately feeding a pulse signal to gates of the switching elements to perform switching of the direct-current input in the full bridge circuit, a serial resonant circuit of a resonant capacitor and an electric power transmission coil being connected to an output of the full bridge circuit in the resonant type full bridge circuit; and an electric power receiving circuit that includes an electric power receiving coil and a rectifying and smoothing circuit, the electric power receiving coil being electromagnetically coupled to the electric power transmission coil, the rectifying and smoothing circuit rectifying an output of the electric power receiving coil, wherein a push-pull output PWM control circuit is provided in the drive circuit that controls the full bridge circuit, and only one of the switching elements in each set of switching elements performs a regenerative operation by an output of the PWM control circuit.

The aspect of the invention provides the non-contact electric power transmission circuit in which the resonant type full bridge circuit can be controlled by the push-pull output PWM control at a level similar to that of the phase shift operation. Therefore, the switching element having the small withstand voltage can be selected to implement the low-cost, high-efficiency non-contact electric power transmission circuit. A measure against noise can easily be performed. The small switching element is used, so that the compact non-contact electric power transmission circuit can be implemented.

DESCRIPTION OF THE PREFERRED EMBODIMENTS

A non-contact electric power transmission circuit according to an embodiment of the invention includes an electric power transmission circuit and an electric power receiving circuit. The electric power transmission circuit includes a full bridge circuit and a resonant type full bridge circuit. A direct-current power supply is used as an input of the full bridge circuit, the full bridge circuit includes two sets of switching elements, two switching elements being connected in series in each set of the switching elements, a drive circuit alternately feeds a pulse signal to gates of the switching elements to perform switching of the direct-current input in the full bridge circuit, and a serial resonant circuit of a resonant capacitor and an electric power transmission coil is connected to an output of the full bridge circuit in the resonant type full bridge circuit. The electric power receiving circuit includes an electric power receiving coil and a rectifying and smoothing circuit. The electric power receiving coil is electromagnetically coupled to the electric power transmission coil, and the rectifying and smoothing circuit rectifies an output of the electric power receiving coil. In the non-contact electric power transmission circuit, a push-pull output PWM control circuit is provided in the drive circuit, and only one of the switching elements in each set of switching elements performs a regenerative operation by an output of the PWM control circuit. Therefore, the resonant type full bridge circuit can be controlled at a level similar to that of the phase shift operation.

Figure 1:
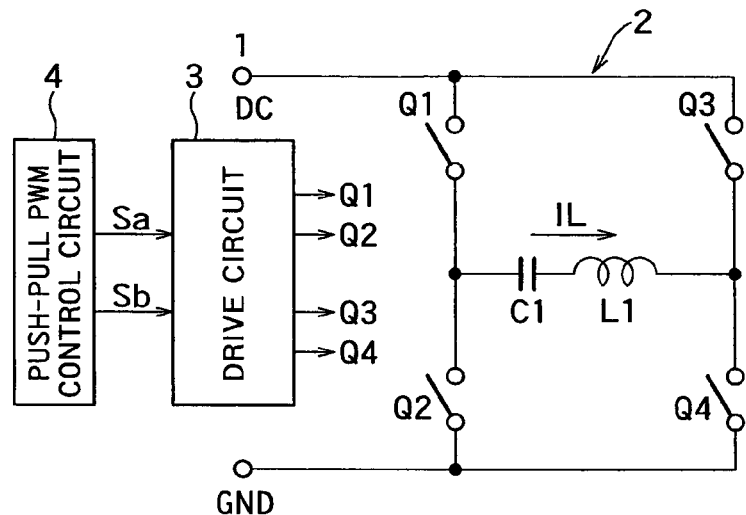
FIG. 1 is a block diagram illustrating an operation of a conventional full bridge circuit.
Figure 2:
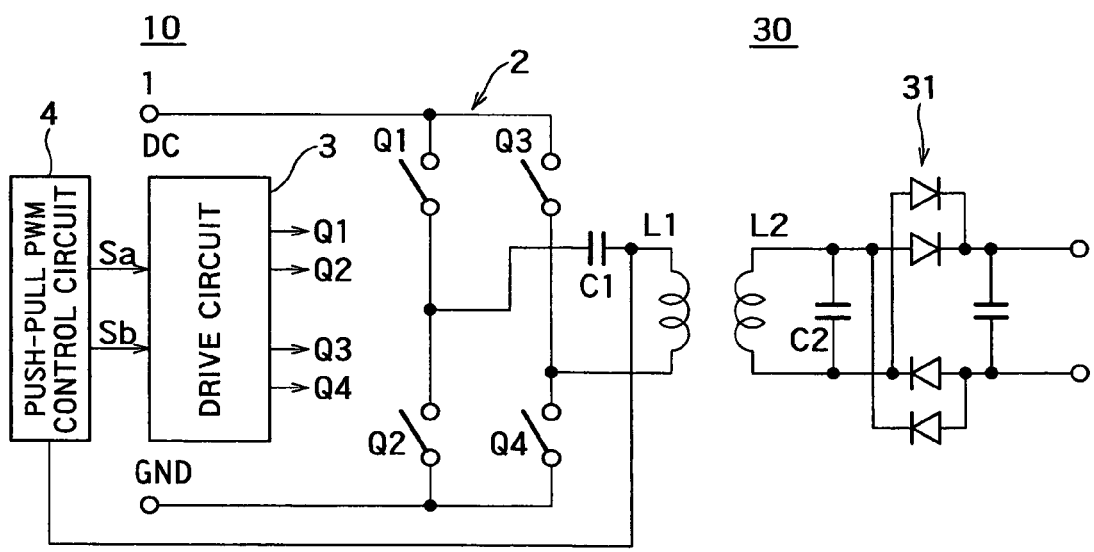
FIG. 2 is a block diagram illustrating a non-contact electric power transmission circuit according to an embodiment of the invention.
Figure 3:
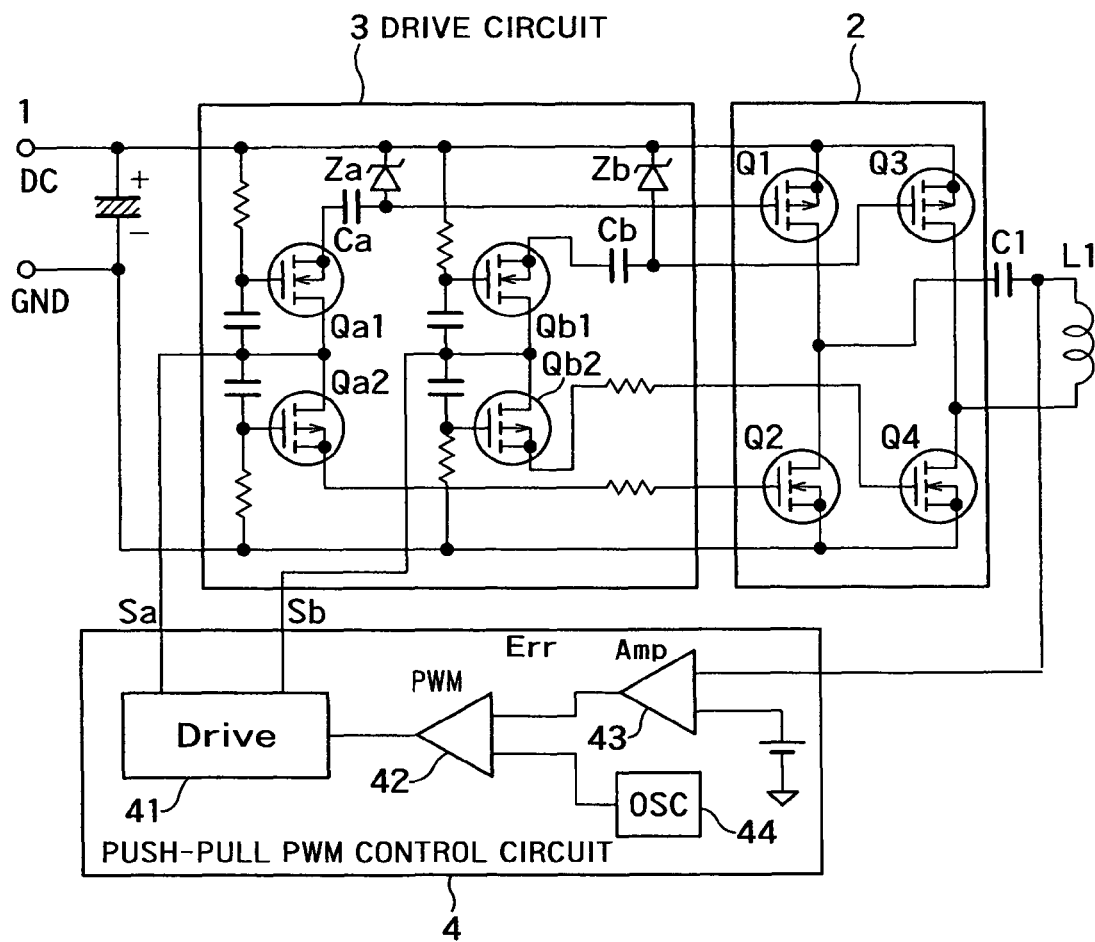
FIG. 3 is a circuit diagram illustrating the non-contact electric power transmission circuit of the embodiment.

FIG. 2 is a block diagram illustrating a non-contact electric power transmission circuit according to an embodiment of the invention. FIG. 3 is a circuit diagram illustrating the non-contact electric power transmission circuit of the embodiment.

As illustrated in FIG. 2, an electric power transmission circuit 10 includes a direct-current power supply 1 that is used as an input, a GND, a full bridge circuit 2, switching elements Q1 to Q4 that constitute the full bridge circuit 2, a resonant capacitor C1, an electric power transmission coil L1, a drive circuit 3, and a push-pull output PWM control circuit 4. An electric power receiving circuit 30 includes an electric power receiving coil L2 and a parallel resonant capacitor C2, and a rectifying and smoothing circuit 31. The electric power receiving coil L2 receives an electric power in a non-contact manner from the electric power transmission coil L1 by electromagnetic induction. The parallel resonant capacitor C2 constitutes a parallel resonant circuit.

As illustrated in FIG. 3, the PWM control circuit 4 supplies push-pull operation PWM control signals Sa and Sb to the drive circuit 3. The drive circuit 3 controls the full bridge circuit 2. That is, the control signal Sa supplied from the PWM control circuit 4 is applied to gates of the series-connected first and second switching elements Q1 and Q2 through the drive circuit 3. The control signal Sb supplied from the PWM control circuit 4 is applied to gates of the third and fourth switching elements Q3 and Q4 through the drive circuit 3. The sine-wave output current is obtained in the electric power transmission coil L1 by turning on and off the first to fourth switching elements Q1 to Q4.

A current or a voltage is detected from a connection point of the resonant capacitor C1 and the electric power transmission coil L1 and fed back to the PWM control circuit 4. Therefore, the output is stabilized to act as a protection circuit against an abnormal value. The PWM control circuit 4 includes an error amplifier 43, an oscillator 44 that generates a fundamental wave signal, an amplifier 42 that generates a PWM control signal, and a driver 41 for the amplifier 42. The error amplifier 43 generates an error signal from a feedback signal obtained at the connection point of the resonant capacitor C1 and the electric power transmission coil L1 and a reference voltage signal. The amplifier 42 compares the error signal with the fundamental wave signal supplied from the oscillator 44, and the amplifier 42 supplies the PWM control signal to the drive circuit 41. The drive circuit 41 generates the PWM control signals Sa and Sb of the positively and negatively symmetric push-pull operation. Thus, pulse widths of the control signals Sa and Sb are determined based on the PWM control signal supplied from the amplifier 42. The control signals Sa and Sb are supplied to the drive circuit 3.

The drive circuit 3 will be described below. As illustrated in FIG. 3, the control signal Sa of the PWM control circuit 4 is applied to a connection point of drains of an N-type switching element Qa1 and a P-type switching element Qa2 in one of sets of switching elements. A source of the switching element Qa1 is connected to the gate of the first switching element Q1 in the full bridge circuit 2. A source of the switching element Qa2 is connected to the gate of the second switching element Q2 in the full bridge circuit 2. Therefore, the switching elements Qa1 and Qa2 are turned on and off by the control signal Sa to control the first and second switching elements Q1 and Q2.

The control signal Sb of the PWM control circuit 4 is applied to a connection point of drains of an N-type switching element Qb1 and a P-type switching element Qb2 in the other set of switching elements. A source of the switching element Qb1 is connected to the gate of the third switching element Q3 in the full bridge circuit 2. A source of the switching element Qb2 is connected to the gate of the fourth switching element Q4 in the full bridge circuit 2. Therefore, the switching elements Qb1 and Qb2 are turned on and off by the control signal Sb to control the third and fourth switching elements Q3 and Q4. At this point, an N-type MOSFET is used in the switching elements Qa1 and Qb1, and the P-type MOSFET is used in the switching elements Qa2 and Qb2.

The full bridge circuit 2 will be described below. As illustrated in FIG. 3, one of the terminals of the resonant capacitor C1 is connected to the connection point of the drains of the first P-type switching element Q1 and second N-type switching element Q2. A source of the first P-type switching element Q1 is connected to a direct-current power supply terminal (DC) 1, and a source of the second N-type switching element Q2 is connected to a direct-current power supply terminal (GND). The connection point of the drains of the third P-type switching element Q3 and the fourth N-type switching element Q4 is connected to one of terminals of the electric power transmission coil L1. A source of the third P-type switching element Q3 is connected to the direct current (DC) 1, and a source of the fourth N-type switching element Q4 is connected to the direct-current power supply terminal GND. The other terminal of the resonant capacitor C1 is connected to the other terminal of the electric power transmission coil L1. At this point, the P-type MOSFET is used in the first and third switching elements Q1 and Q3, and the N-type MOSFET is used in the second and fourth switching elements Q2 and Q4.

The control signals Sa and Sb supplied from the push-pull PWM control circuit 4 turn on and off the first to fourth switching elements Q1 to Q4 of the full bridge circuit 2 through the drive circuit 3. Therefore, the sine-wave output current is generated in the electric power transmission coil L1. Referring to FIG. 2, the output current supplies the electric power from the electric power transmission coil L1 to the electric power receiving coil L2 by the electromagnetic induction. The rectifying and smoothing circuit 31 rectifies the alternating-current electric power generated in the electric power receiving coil L2, and the rectifying and smoothing circuit supplies a predetermined direct-current voltage. The electric power receiving circuit 30 is used to charge a secondary battery of a mobile device or the like. The electric power receiving circuit 30 may be used as a power supply of another device through the secondary battery. The drive circuit 3 becomes a capacitive coupling-state by the capacitors Ca and Cb of FIG. 3, and GND becomes a midpoint. Therefore, because only a half voltage is applied to the gates of the first and third switching elements Q1 and Q3, a level shift is performed by Zener diodes Za and Zb such that a predetermined voltage (Vgs) is applied to the gates of the first and third switching elements Q1 and Q3.

Figure 4:
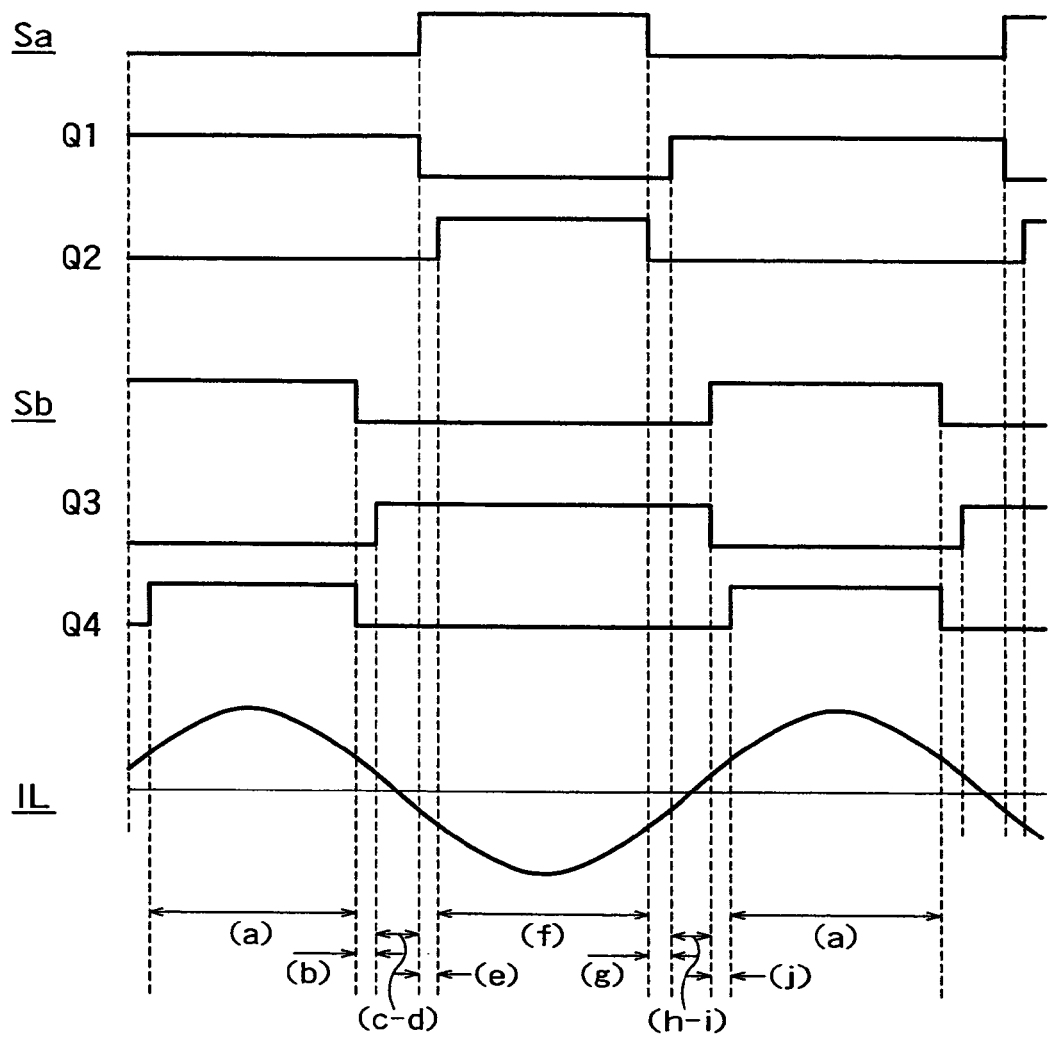
FIG. 4 is a timing chart illustrating an operation of each switching element in a full bridge circuit used in the non-contact electric power transmission circuit of the embodiment.
Figure 5:
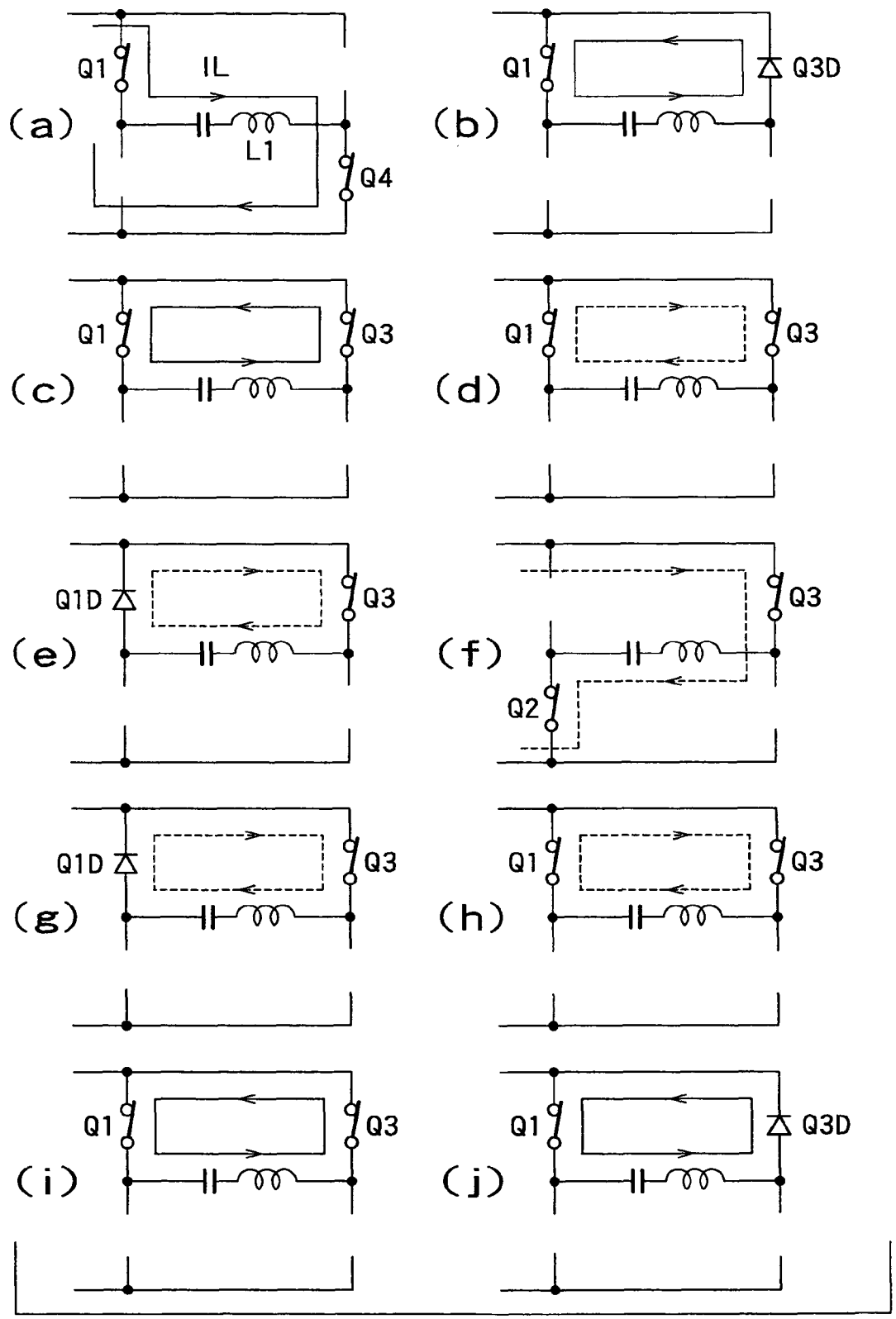
FIG. 5 illustrates an operation of each switching element in a full bridge circuit used in the non-contact electric power transmission circuit of the embodiment.

An operation of the electric power transmission circuit 10 in the non-contact electric power transmission circuit of the embodiment will be described below. FIG. 4 is a timing chart illustrating operations of switching elements Q1 to Q4 in the full bridge circuit 2 of FIG. 3. FIG. 5 illustrates the operations of the switching elements Q1 to Q4 in the full bridge circuit 2. In FIGS. 4 and 5, the control signals Sa and Sb express output signal waveforms of the push-pull output PWM control circuit 4, and the numerals Q1 to Q4 expresses on-off waveforms of the switching elements Q1 to Q4 constituting the full bridge circuit 2. The letter IL expresses an output current passed through the electric power transmission coil L1, and an arrow expresses a direction of the output current. The letters (a) to (j) express on-off operations of the switching elements Q1 to Q4. The letters (a) to (j) of FIG. 4 express times corresponding to FIGS. 5A to 5J.

Referring to FIGS. 4 and 5A to 5J, in the state (a), the first and fourth switching elements Q1 and Q4 of the full bridge circuit 2 are turned on. At this point, the positive current IL (in the direction expressed by an arrow) is passed through the electric power transmission coil L1.

In the state (b), the fourth switching element Q4 is switched from the turn-on to the turn-off while the first switching element Q1 is turned on. The first switching element Q1 and a body diode Q3D of the third switching element Q3 perform the energy regeneration.

In the state (c), the third switching element Q3 is switched from the turn-off to the turn-on while the first switching element Q1 is turned on. The energy regeneration is continued.

In the state (d), the current passed through the electric power transmission coil L1 is reversed while the first and third switching elements Q1 and Q3 remain in the on-state. The negative current IL (in the direction expressed by a dotted-line arrow) is passed through the electric power transmission coil L1, and the energy regeneration is continued.

In the state (e), the first switching element Q1 is switched to the turn-off. A body diode Q1D of the first switching element Q1 and the third switching element Q3 continue the energy regeneration.

In the state (f), the second switching element Q2 is switched to the turn-on while the third switching element Q3 is turned on. The negative current IL (in the direction expressed by the dotted-line arrow) is passed through the electric power transmission coil L1.

In the state (g), the second switching element Q2 is switched to the turn-off. The third switching element Q3 and the body diode Q1D of the first switching element Q1 perform the energy regeneration.

In the state (h), the first switching element Q1 is switched to the turn-on. The third and first switching elements Q3 and Q1 continue the energy regeneration.

In the state (i), the direction of the current IL passed through the electric power transmission coil L1 is reversed while the first and third switching elements Q1 and Q3 are turned on. The positive current IL (in the direction expressed by the solid-line arrow) is passed through the electric power transmission coil L1, and the energy regeneration is continued.

In the state (j), the third switching element Q3 is switched to the turn-off. The body diode Q3D of the third switching element Q3 and the first switching element Q1 continue the energy regeneration.

Then the operation returns to the state (a), and the first and fourth switching elements Q1 and Q4 are turned on to repeat one-period operations (a) to (j).

In the full bridge circuit of the embodiment, only the first and third switching elements Q1 and Q3 perform the regenerative operation. Advantageously the push-pull output control signal can effectively be utilized to easily perform the on-off operation of the switching element.

In the resonant type full bridge circuit of the embodiment, only the first and third switching elements Q1 and Q3 perform the regenerative operation by the push-pull output PWM control. The on-off operation of the switching element is easily performed using the push-pull output control signal, and the control signal can effectively be utilized. As a result, the invention provides the non-contact electric power transmission circuit that can perform the control similar to that of the conventional phase shift operation. The switching element having the small withstand voltage can be selected to implement the low-cost, high-efficiency non-contact electric power transmission circuit. The measure against noise caused by the voltage vibration can easily be taken, and the small switching element can be used to implement the compact non-contact electric power transmission circuit.

The invention is not limited to the embodiment. For example, the push-pull operation PWM control circuit and the drive circuit are described in the embodiment. Alternatively, a control IC (integrated circuit) including the push-pull operation PWM control circuit and the drive circuit may be formed. IC including the full bridge circuit may be used. An air core coil may be used as the electric power transmission coil or the electric power receiving coil. A coil in which a magnetic material such as a ferrite core and an amorphous core is used may be used as the electric power transmission coil or the electric power receiving coil.

What is claimed is:

1. A non-contact electric power transmission circuit comprising:

an electric power transmission circuit that includes a resonant type full bridge circuit having a full bridge circuit, a direct-current power supply being used as an input of the full bridge circuit, the full bridge circuit including two sets of first switching elements, two first switching elements being connected in series in each set of the first switching elements, wherein each of the two sets of first switching elements includes a switching element in which a P-type MOSFET is used and a switching element in which an N-type MOSFET is used, a drain of the P-type MOSFET and a drain of the N-type MOSFET being connected to each other, a source of the P-type MOSFET is connected to a DC terminal of the direct-current power supply, and a source of the N-type MOSFET is connected to a GND terminal of the direct-current power supply, thereby forming a full bridge circuit in which the four switching elements are used, a drive circuit including two sets of second switching elements, each element being connected in series, wherein each of the second switching elements include a second P-type MOSFET and a second N-type MOSFET, a source of the second P-type MOSFET and a source of the second N-type MOSFET being connected to each other, the drive circuit alternately feeding a pulse signal to sources of the first switching elements to perform switching of the direct-current input in the full bridge circuit, and a serial resonant circuit which has a resonant capacitor and an electric power transmission coil being connected to an output of the full bridge circuit in the resonant type full bridge circuit; and an electric power receiving circuit that includes an electric power receiving coil and a rectifying and smoothing circuit, the electric power receiving coil being electromagnetically coupled to the electric power transmission coil, the rectifying and smoothing circuit rectifying an output of the electric power receiving coil, wherein a push-pull output PWM control circuit supplies PWM signals to the drive circuit that controls the full bridge circuit, and only one of the P-type MOSFETs in each set of the first switching elements performs a regenerative operation by an output of the PWM control circuit.

2. The non-contact electric power transmission circuit according to claim 1, wherein the PWM control circuit includes a feedback circuit that detects a current passed through the electric power transmission coil or a voltage generated across the power transmission coil and detects a state of an electric power receiving load.

3. The non-contact electric power transmission circuit according to claim 1, wherein the drive circuit and the PWM control circuit are formed by an integrated circuit.

* * * * *